US005606786A

United States Patent [19]

Presby

[11] Patent Number: 5,606,786

[45] Date of Patent: Mar. 4, 1997

[54] APPARATUS AND METHOD FOR PRODUCING PIPE AND PIPE PRODUCED THEREBY

[76] Inventor: David W. Presby, P.O. Box 617, Sugar Hill, N.H. 03585

[21] Appl. No.: 536,804

[22] Filed: Sep. 29, 1995

[51] Int. Cl.[6] .................... B23C 3/00

[52] U.S. Cl. .................... 29/33 T; 72/71; 72/370; 83/54; 409/143

[58] Field of Search .................... 29/33 D, 33 T; 72/71, 113, 203, 204, 186, 193, 132, 135, 70, 136, 370, 367; 83/54, 187, 188, 191, 183, 185, 195; 409/143, 167, 275, 259, 260, 304, 305

[56] References Cited

U.S. PATENT DOCUMENTS

| | | | |
|---|---|---|---|
| 3,678,718 | 7/1972 | Brown et al. | 72/71 |
| 3,815,399 | 6/1974 | Foulks et al. | 72/186 |
| 3,851,552 | 12/1974 | English et al. | 83/191 |
| 4,052,880 | 10/1977 | Cullinan et al. | 72/326 |
| 4,270,878 | 6/1981 | Fales | 83/54 |
| 5,062,187 | 11/1991 | Bromley | 29/33 T |
| 5,197,540 | 3/1993 | Yagi et al. | 409/143 |
| 5,368,423 | 11/1994 | Hanna | 409/143 |
| 5,378,092 | 1/1995 | Griner | 409/143 |

*Primary Examiner*—M. Rachuba
*Assistant Examiner*—Christopher Kirkman
*Attorney, Agent, or Firm*—George W. Dishong

[57] ABSTRACT

An apparatus and method for perforating corrugated plastic pipe from the inside of the pipe to the outside and the pipe produced by the method. The apparatus has a perforating device attached to an elongated support member. Perforations are created by advancing pipe over the perforating device or by advancing the perforating device into the interior of the pipe. Where the pipe is advanced over the perforating device, a carriage, holding the pipe, is riding on a track which guides the pipe into engagement or into cutting or perforating proximity with the perforating device. The perforating device includes a housing holding motors with cutters attached to them. The cutters cut the inner corrugations or the valleys of the pipe as the pipe is passed over the perforating device. Pipe is perforated by advancing it over a perforating device, and curing the pipe from the inner pipe surface to the outer pipe surface. The perforated pipe made using this apparatus and method is distinguishable from similar pipe where the preforations are made from the outside of the pipe to the insided of the pipe.

17 Claims, 5 Drawing Sheets

APPARATUS AND METHOD FOR PRODUCING PIPE AND PIPE PRODUCED THEREBY

BACKGROUND OF THE INVENTION

1. Field of the Invention

This invention most generally relates to an apparatus and method for perforating pipe. More particularly, the invention relates to the perforating of pipe from the inside of the pipe to the outside of the pipe. More particularly, the invention relates to the perforating of corrugated plastic pipe by passing a section of corrugated plastic pipe over a cutter or by advancing the perforating cutter into the interior of the pipe, the cutter cutting perforations in the pipe as the pipe is passed over the cutter or the cutter is inserted into the pipe.

The invention has the particular objectives, advantages and features of: 1) increased cutting speed; 2) size of notches being cut can be changed more readily; 3) multiple notches can be cut using the same cutter; 4) more efficient; 5) slots may be round holes or non-round; 6) indexing for the number of holes or slots may be more easily accomplished; 7) can be set up to do spiral cutting from the inside so as to not weaken the strength of the pipe in any location as to the extent that it would happen with slots cut in the same location along the piece of pipe; 8) allows for pipe to be stored without perforations, and then perforated as needed; 9) various bits, saws, blades, and routers can be employed; 10) major components readily available; 11) Half the perforations may be cut on the way in and half on the way out.

2. Description of the Prior Art

Many drainage pipes are produced from plastic materials, either by extrusion or blow molding, with the pipe being cut into lengths or rolled on a large drum to be carded in the field. To obtain high rigidity and maximum utilization of material, such drainage pipes are commonly corrugated with the corrugations extending circumferentially around the pipe. Corrugated plastic pipe is widely used for many types of domestic, agricultural, and industrial drainage and waste disposal systems.

Preferably, drainage holes are positioned in the wall of the inner corrugation so that, when the pipe is ultimately buried in the earth, the drainage holes are not packed as tightly as would be the case if they were positioned in the outer corrugation. Having the perforations on the inner corrugation facilitates drainage from the pipe, but, for obvious reasons, complicates the formation of the perforations.

It is therefore desirable to have an effective apparatus and method for creating perforations on the inner corrugation or valley portions of a corrugated pipe. All of the perforating machines and methods for perforating the pipe known by the inventor hereof, perforate, drill or punch the holes or apertures from the outside of the pipe to the inside of the pipe. Such curing is inherently slow and cumbersome. Various cutters or punches have been used in the prior art to perforate the inner corrugation.

The following patents relate to the technology of the present invention, but none of them meets the objects of the presently disclosed and claimed invention. Additionally, none are as effective and as efficient as the instant apparatus and method.

U.S. Pat. No. 4,587,874 to Lupke, et. al. discloses a rotary punch. The rotary punch is a spindle carrying a cutting tool and a drive for rotating the spindle about its own axis while revolving the spindle about the pipe. The cutter periodically engages and perforates the pipe.

U.S. Pat. No. 4,204,447 to Slaughterbeck discloses an apparatus for perforating corrugated plastic pipe. The Slaughterbeck apparatus employs a plurality of reciprocally moving heated punches which punch radially into the pipe and are then removed to form perforations. The pipe is then translated to another position for the next punching step.

U.S. Pat. No. 4,180,357 to Lupke, et. al. discloses an apparatus and method for perforating pipe and method of producing part of such apparatus. The Lupke apparatus advances corrugated pipe along its axial path by rotatably driven lead screw members, the screw threading of which is in meshing engagement with the corrugations of the pipe. The lead screw members present outwardly directed cutters which are synchronized to simultaneously intersect the pipe thereby creating perforations.

U.S. Pat. No. 4,104,942 to Leloux discloses a device for manufacturing perforated plastic pipes. Disclosed is a device having at least one punching member, to which a velocity is imparted in the direction of conveyance of the plastic pipes. During the punching operation, the punching members remain substantially perpendicular with respect to the plastic pipes.

U.S. Pat. No. No. 3,916,763 to Maroschak discloses an apparatus for forming slits in tubes. The Maroschak apparatus an improved means of feeding a tube through a slitting station in a stepwise manner, wherein rotary cutting blades and moved into and out of cutting engagement with the tube between successive stepwise movements thereof.

U.S. Pat. No. 3,901,113 to Oltmanns, et. al. discloses a device to cut holes within the wave troughs of a corrugated tube, especially for drainage. The device employs tool supports geared with the waves of the tube. The tube and tool support are synchronized.

U.S. Pat. No. 3,877,831 to Maroschak discloses a method and apparatus for drilling holes in tubes. The tube is fed through a drilling station where one or more longitudinal rows are drilled in the wall of the tube by means of a corresponding number of rotating drill bits. The drilling station includes a separate drilling head for forming each row of holes. Each of the drilling heads is rotated in timed relation to the movement of the tube so as to drill holes therein without interrupting or retarding the movement of the tube.

U.S. Pat. No. 3,831,470 to Maroschak discloses a method and apparatus for forming slits in tubes. Maroschak discloses intermittently feeding the tube through a slitting station in a stepwise manner and moving a plurality of rotating cutting blades which encircle the path of travel of the tube into cutting engagement with the tube between successive stepwise movements. The apparatus includes a pair of rotary feed members which engage portions of the tube closely adjacent sets of rotary cutting blades arranged around the path of travel of the tube, and means for imparting stepwise movement to the tube in timed relation to the inward and outward movements of the cutting blades. U.S. Pat. No. 3,824,886 to Hegler discloses an apparatus for cutting apertures in tubes. The Hegler apparatus employs means for revolving a cutter about the pipe to be cut in cooperation with a means for moving the cutting surface in an epitrochoid path as it passes through the exterior surface.

U.S. Pat. No. 3,698,222 to Blake discloses a perforating machine. The Blake machine employs a rotating punch and die roll means in cooperation with corrugated roll means. The punch roll being formed of disks separated by spacers.

The patents noted herein provide considerable information regarding the developments that have taken place in this field of technology. Clearly, the present invention provides many advantages over the inventions noted above. Again it is noted that none of the inventions listed above cuts from the inside of the pipe to the outside. As such, none is as effective or efficient as the present invention.

By cutting corrugated pipe from the inside, it is not required that the pipe be perforated in a stepwise manner. Rather, the pipe can be advanced over the insertable perforating means in a substantially continuous motion or the pipe may be stationary and the perforating means or cutter head may be moved into the interior of the pipe. It is also possible to create another set of perforations while removing the pipe from about the perforating means or extracting the perforating device from within the pipe. The pipe may be rotated after the initial advancement over the perforating means and before the pipe is removed from about the perforating means to create different set of perforations. Alternatively, the pipe may be rotated as it is advanced over the perforating means so as to create a perforation pattern which is non-linear. The non-linear perforation pattern can be a spiral pattern by continuously rotating the pipe as it is advanced over the perforating means. It should also be obvious that there may be advantage to have different size holes and a non-symmetric hole pattern in the pipe. All of these variations are easily achieved with the instant apparatus and method.

Additionally, the present invention may include a gear trailing the perforating means in such a way as to have the cutters move in and out, thereby making alternate cuts on possibly every other rib of the corrugated pipe or detent as it travels along. More than one rib could be skipped.

The present invention may also be employed to perforate pipe as it comes off an extruder. This embodiment would employ a trailing wire, a flexible shaft, or conduit coming from the extruder to the perforating means which would also hold onto the cutting head and supply power at the same time to run the cutters. Obviously, this operation would take place at a sufficient distance and time from the extrusion process to allow the plastic to cool. The result would be that as the pipe slides over the cutters, which would be held in place by cable or wire, it would cut the notches which are desired within the pipe, and could use the above methods of gearing for cutting notches and slots and spiraling within the pipe or skipping detents within the pipe as necessary. This embodiment could produce virtually any length or an endless length of perforated pipe.

The perforated pipe which is produced by the present invention is distinctive due to having been cut from the inside out thereby creating apertures or holes which could be identified as being made from inside to outside the pipe. The perforations in the perforated pipe produced by the present invention may be of various shapes. For example, the perforations may be round or slotted.

SUMMARY OF THE INVENTION

This invention most generally relates to an apparatus and method for perforating pipe by passing the pipe over a perforating means or by advancing the perforating means into the interior of the pipe and curing perforations in the pipe from the inner surface to the outer surface. It is noted that it is only necessary that there be relative linear movement and there may also be relative rotational movement, simultaneously with or separately from the linear movement, between the pipe and the perforation means. More particularly, the invention relates to an apparatus having a support system, a perforating means attached to the end of the support system; and a means for advancing the pipe over the perforating means in order to perforate the pipe.

A basic object of the present invention is to provide an apparatus for perforating pipe comprising a support system having a first end, a means for perforating the pipe attached to the first end of the support system and a means for causing the pipe and the means for perforating the pipe to perforatingly interengage interior of the pipe whereby perforations are created in the pipe. The perforations thus made are created from inside the pipe to the outside of the pipe.

An object of the present invention is to provide an apparatus for perforating pipe that perforates pipe faster than those of the prior art, and that allows for holes to be either round or slotted.

It is a primary object of the present invention to provide an advancing means for the apparatus for perforating pipe that employs a carriage which rides upon rails, and which can give support to the pipe as it is advanced over or removed from over the perforating means.

It is a further object of the present invention to provide a carriage with at least one semicircular member as part of the advancing which can impart longitudinal rotation to a pipe so that the location of the perforations around the circumference of the pipe can be varied.

It is a further object of the present invention to provide as part of the advancing means, a track with at least one rail whereupon the carriage can be moved, thus engaging and disengaging the pipe with the perforating means.

It is still a further object of the present invention to provide a base for the carriage with rollers on it to allow the semicircular member or semicircular members to rotate and with wheels to roll upon the mils of the track.

It is still a further object of the present invention to provide a support system for the perforating means that includes an elongated member with a cavity therethrough, the cavity allowing for the passage of conduits for electrical, hydraulic, or pneumatic power. The cavity is also to allow for the passage of air.

It is an object of the present invention to provide a fan or blower at one end of the support system to transmit air through the elongated member to the perforating means to assist in the cooling of the motors in the perforating means and to assist in the removal of cut pipe from the perforating means.

It is a further object of the present invention to provide a counterweight as part of the support system to offset the moment created by the extension member and the perforating means on the end thereof.

A primary object of the present invention is to provide a perforating means which has motors to impart rotational power to cutters disposed in a housing.

It is a further object of the present invention to provide a perforating means which can maintain a constant cutting depth by using guide members. The guide members being attached to either the motor or to the housing by springs, thus maintaining a substantially constant distance between the inner corrugation to be cut and the cutter.

It is an object of the present invention to provide a method of perforating pipe whereby a pipe is advanced over a perforating means, the perforating means cuts the pipe as it is advanced over the perforating means. The pipe is cut from the inner surface to the outer surface.

It is an additional object of the present invention to provide a method of perforating pipe whereby perforations may be cut in the pipe both as it is advanced and as it is removed from over the perforating means. Specifically, the pipe may be longitudinally rotated once it is advanced over the perforating means and before it is removed from the perforating means so that a new series of perforations may be cut in the pipe while the pipe is being removed from over the perforating means. Being able to cut while removing the pipe as well as while advancing it makes the process much more efficient.

It is an additional object of the present invention to rotate the pipe longitudinally while advancing or removing it from over the perforating means to provide for a non-linear series of perforations. Additionally, a method of making a spiral pattern of perforations is provided for by rotating the pipe at a substantially constant rate while advancing or removing it from over the perforating means.

A still further object of the present invention is to provide a perforated pipe made by the processes of the present invention. The perforated pipe made by the processes of the present invention is distinctive in several aspects. The perforated pipe may have a non-linear or spiral pattern of perforations, thus making the pipe stronger than similar pipes with linear patterns of perforations. Also, the pipe perforated by the processes of the present invention may also have distinctive perforations. The perforations may be either round or slotted, and by virtue of being cut from the inside, their cut edges are different from those pipes perforated from the outside.

These and further objects of the present invention will become apparent to those skilled in the art to which this invention pertains and after a study of the present disclosure of the invention.

DESCRIPTION OF THE PREFERRED EMBODIMENTS

The following is a description of the preferred embodiment of the invention. It is clear that there may be variations in the size and the shape of the apparatus, in the materials used in the construction and in the orientation of the components. However, the main features are consistent and are:

1) perforations cut from the inside of the pipe outwardly;
2) size of perforations easily changed;
3) perforations may be round or slotted;
4) half the perforations may be cut while advancing the pipe over the perforating means or inserting the means for perforating the pipe into the pipe and half cut while the pipe is being removed from over the perforating means (it is only necessary that there be relative linear movement but there may aim be relative rotational movement, simultaneously with or separately from the linear movement, between the pipe and the perforation means);
5) spiral and alternating perforating possible.

Figure 1:
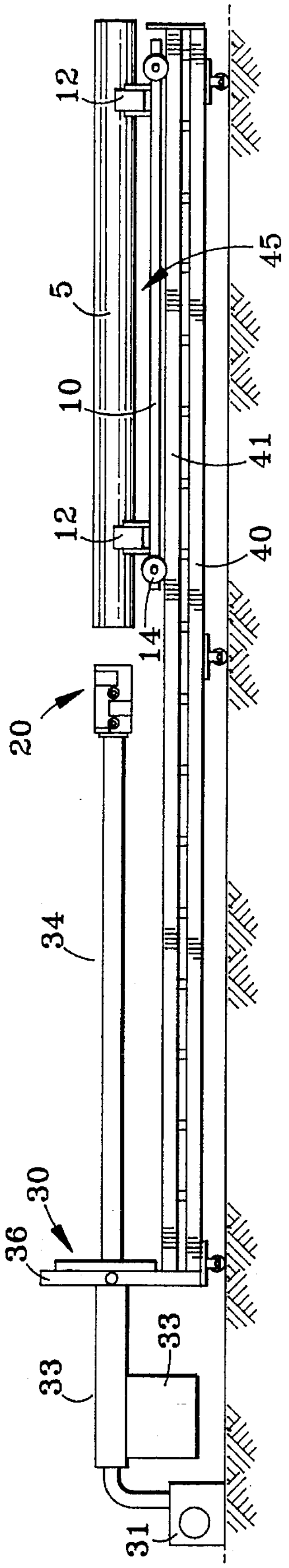
FIG. 1 is a side view schematic illustration of the invention generally.

As shown in FIG. 1, an apparatus for perforating pipe comprises a support system 30, a perforating means 20, and an advancing means 45.

Figure 2:
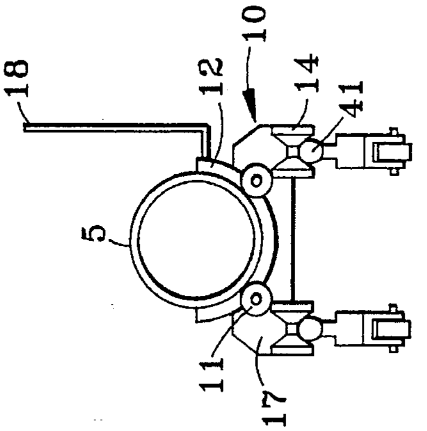
FIG. 2 is an end view of the invention illustrating the track, carriage, and pipe.
Figure 3:
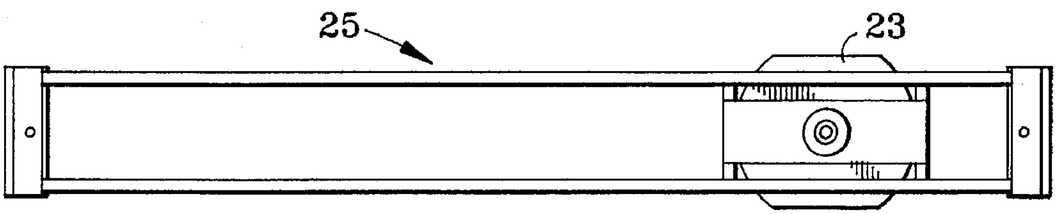
FIG. 3 is a schematic illustration of the perforating means.

The advancing means 45 may include carriage* 10 which gives support to pipe 5. Carriage 10can have wheels 14 which roll on rail 41, thus permitting the carriage 10 to carry pipe 5 into and out of engagement with perforating means 20. As illustrated in FIG. 2, the carriage 10 may also have rollers 11 upon which semicircular member 12 rests. Semicircular member 12 supports pipe 5 and is rotatable around the longitudinal axis of pipe 5, thus rotating the pipe. To assist in the rotation of semicircular member 12, a handle 18 is provided so that the pipe may be manually rotated. Handle 18 is connected to the carriage. The handle may be specifically connected to the semicircular member 12. Preferably, there are two semicircular members on carriage 10 to give support to pipe 5 at both ends. It is also desirable to have the semicircular members connected by side bars.

The advancing means 45 may also include a track 40 upon which carriage 10 may move. As illustrated in FIGS. 1 and 2, it is preferable that the track have two rails 41. Carriage wheels 14 roll on top of rails 41 to carry carriage 10 thus pipe 5 in and out of engagement with perforating means 20.

The support system 30 is attached to and gives support to perforating means 20. As shown in FIG. 1, support system 30 preferably includes elongated member 34, counterweight 33, balance member 36, and blowing means 31. Elongated member 34 is attached to perforating means 20 at one end and to balance member 36 on the other. Elongated member 34 is preferably substantially perpendicular to balance member 36. It is preferable that elongated member 34 have a cavity therethrough. The cavity through elongated member 34 allows for the passage of power to be carded to the perforating means 20. Power may be passed to perforating means 20 via electrical, pneumatic, or hydraulic conduits.

Additionally, air may be passed through the cavity through elongated member 34. Air is blown from blowing means 31 through elongated member 34 to perforating means 20 to assist in the cooling of the perforating means 20 and the cutting operation. The blown air is also desirable because it tends to blow cut pipe particles from the perforating means. Preferably, as shown in FIG. 1, the blowing means may be directly connected to counterweight 33, which has a cavity therethrough, thus allowing air to pass from blowing means 31, through counterweight 33, through balance member 36 to elongated member 34. Blowing means 31 may comprise any device which produces an air flow. It is preferred that the blowing means comprise of a blower or fan.

As shown in FIG. 1, balance member 36 gives support to elongated member 34. Counterweight 33 is preferably attached to balance member 36 to offset the moment created about balance member 36 by elongated member 34 and perforating means 20. Additionally, balance member 36 is preferably connected to track 40.

In FIGS. 3–6, the preferred embodiment of the perforating means is illustrated. As illustrated, the perforating means preferably comprises a housing 25, four motors 23, a cutter 21 attached to each motor 23, springs 24, and guide members 22. The cutter can be a saw, a router, a milling bit, or a drill bit. The housing 25 preferably has four sides and two ends. The motors 23 are oriented such that the cutters 21 each extend from a different side 90 degrees apart. Thus, when a pipe is passed over the perforating means, four sets of perforations are cut, each 90 degrees apart.

Figure 4:
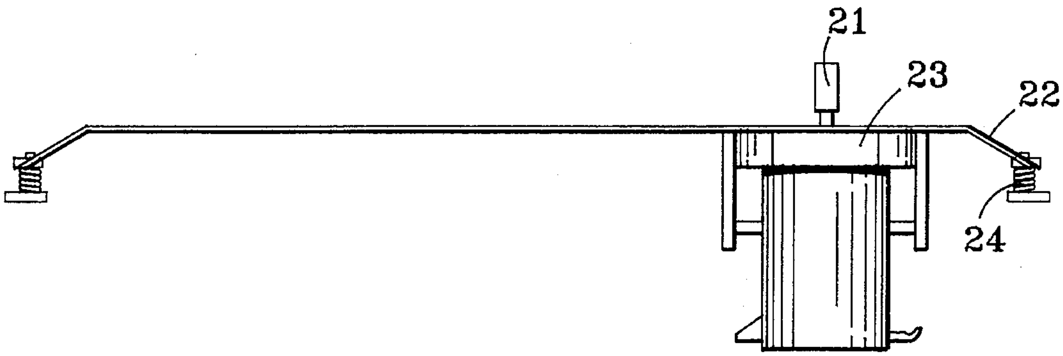
FIG. 4 is a schematic illustration of the perforating means motor and guide member combination.
Figure 5:
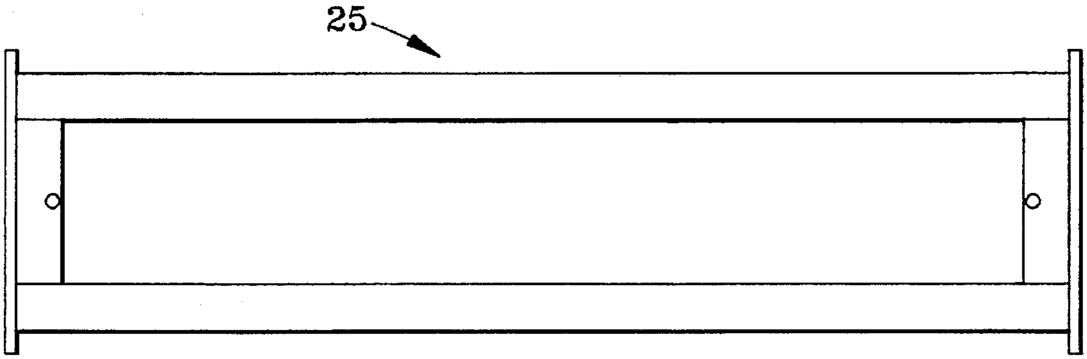
FIG. 5 is a schematic illustration of the perforating means with the motors, cutters, and guide members removed.
Figure 6:
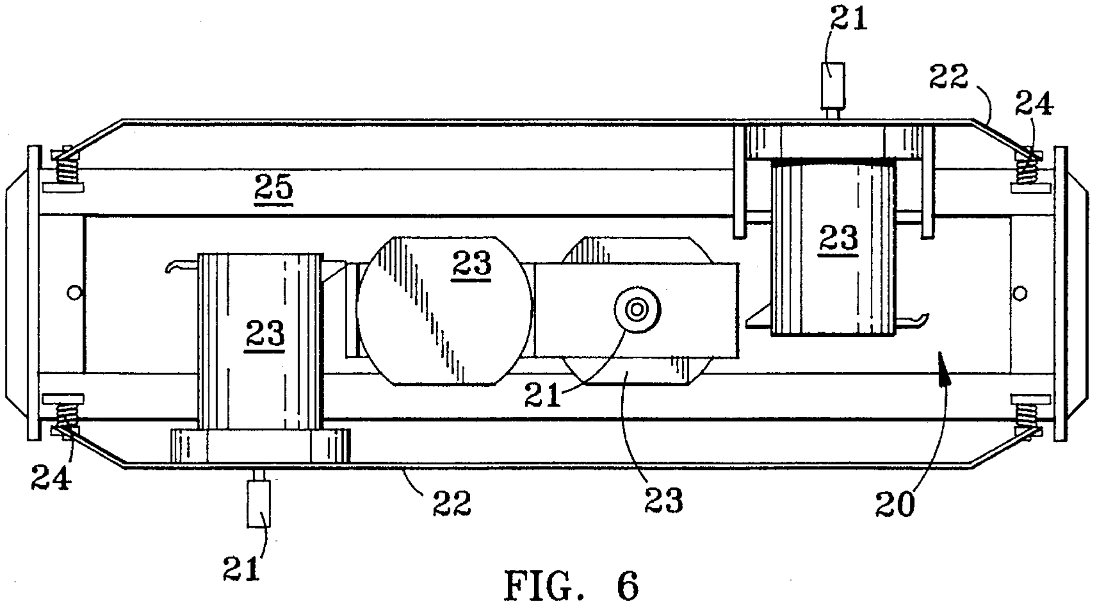
FIG. 6 is a schematic illustration of the perforating means generally.
Figure 7:
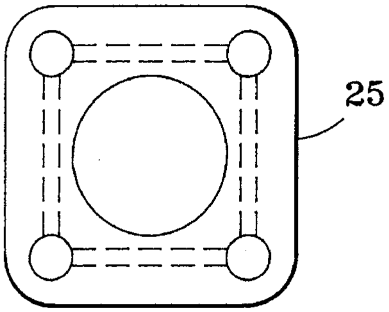
FIG. 7 is an end view of the perforating means.
Figure 8:
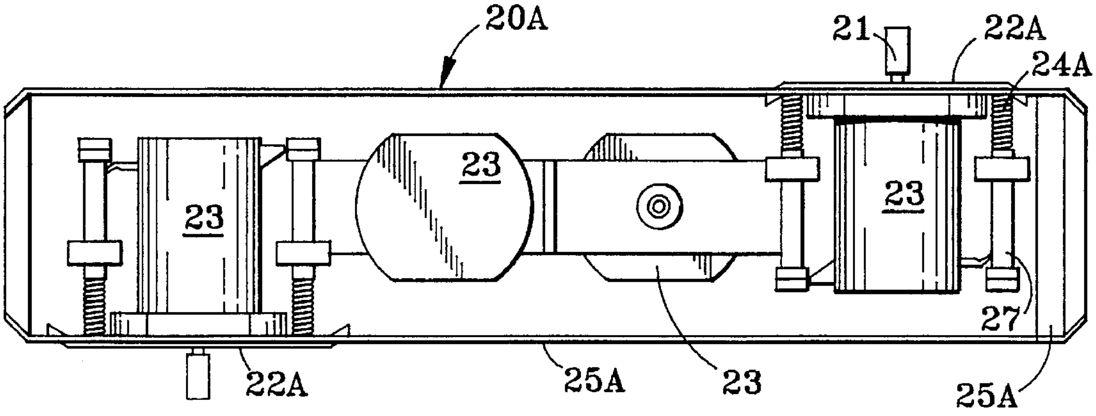
FIG. 8 is a schematic illustration of the perforating means generally.
Figure 9A:
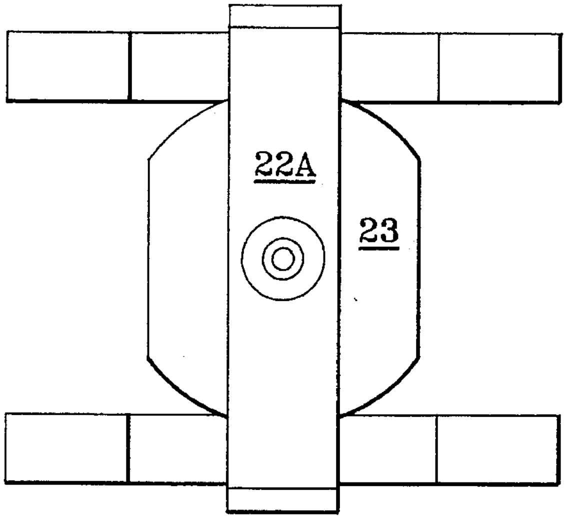
FIG. 9A is a top view of a cutter device having attached thereto the bracket used to attach to the cutter housing and alternative guide members which cause the cutter to move inwardly and outwardly within the interior of the pipe.
Figure 9B:
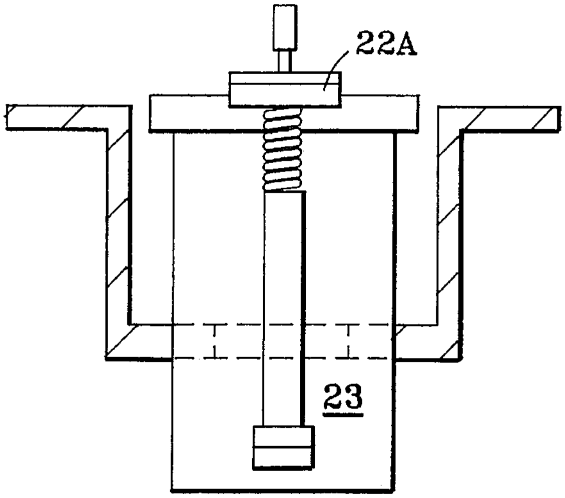
FIG. 9B is a side view of the illustration of FIG. 9A with the deflection mechanism shown in section.
Figure 10:
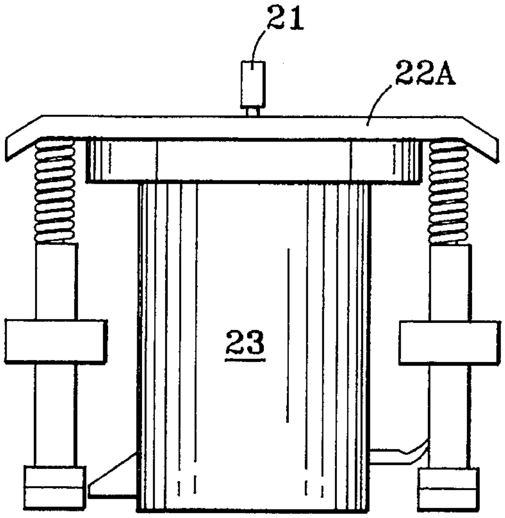
FIG. 10 is a schematic illustration of the motor, cutter, spring, alternative guide member combination of FIG. 9B without the bracket.
Figure 11:
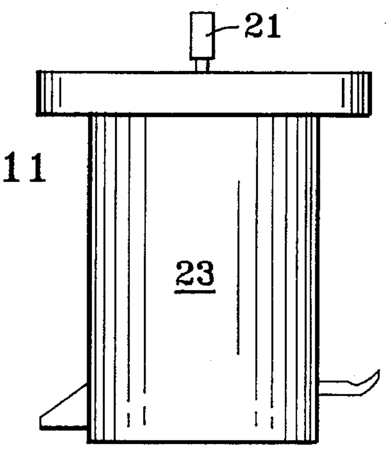
FIG. 11 is a illustration of a motor and cutter with switch and power cord represented.
Figure 12:
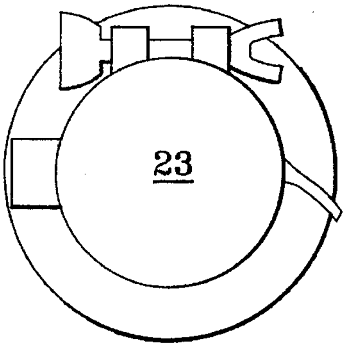
FIG. 12 is an end view of the motor and cutter illustrating the clamping device which is a generally a p:art of the motor and cutter assembly.

As illustrated in FIGS. 4 and 6, guide members 22 are attached to housing 25 by a spring connection. The guide members are fixedly attached to the motor, having a definite distance between the guide member and the tip of the cutter. When pipe 5 is passed over perforating means 20, guide members 22 are compressed by the inner corrugations of the corrugated pipe. Preferably two substantially parallel guide members per cutter are employed, one on each side of the cutter. The distance between the cutter tip and the guide member defines the depth of the cut as the pipe is passed over the perforating means. This is advantageous in that pipes of irregular inner diameter may be cut with a substantially regular cut depth and that pipes of various inner diameters may be perforated by the present invention.

FIGS. 8, 9A, 9B, 10, and 13 illustrate another version of the invention, particularly perforating means 20A wherein guide member 22A is fixedly attached to motor 23 and is attached by springs 24A to cylinder 27 attached to and within housing 25A. When pipe 5 is passed over perforating means 20A, guide members 22A are compressed by the inner corrugations of the corrugated pipe. Upon compression of the guide members, the motor 23 and thus the attached cutter 21 are re-positioned. The distance between the cutter tip and guide member 22A defines the depth of the cut as the pipe is passed over the perforating means. This is advantageous in that pipes of irregular inner diameter may be cut with a substantially regular cut depth and that pipes of various inner diameters may be perforated by the present invention. Preferably two substantially parallel guide members per cutter are employed, one on each side of the cutter.

Figure 14:
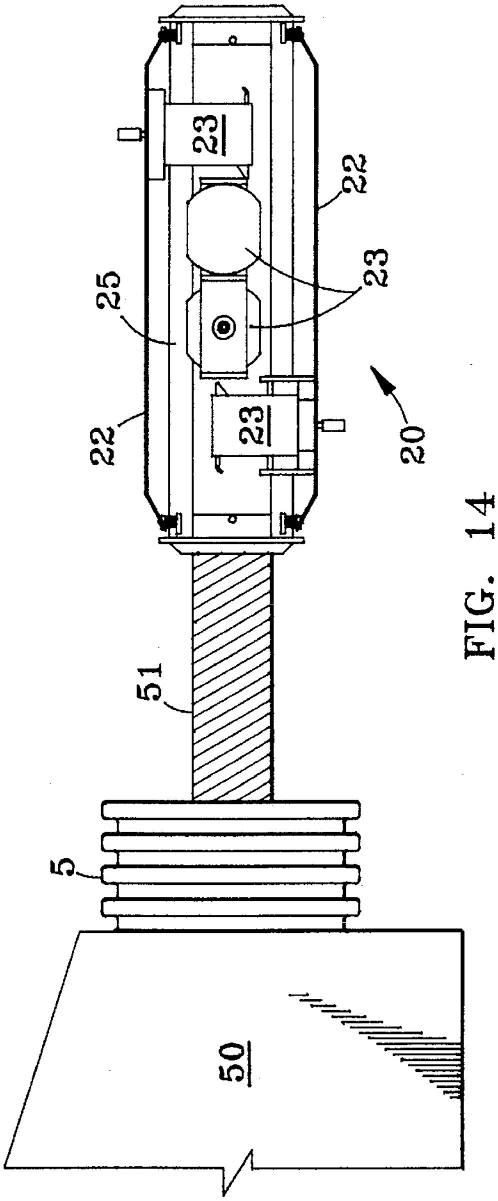
FIG. 14 is a schematic illustration of the perforating means used on pipe as the pipe comes out of an extruder.
Figure 15A:
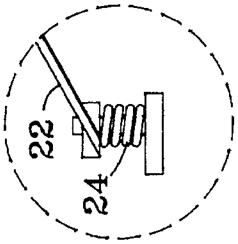
FIG. 15 is a detail of the guide member and spring assembly.
Figure 15:
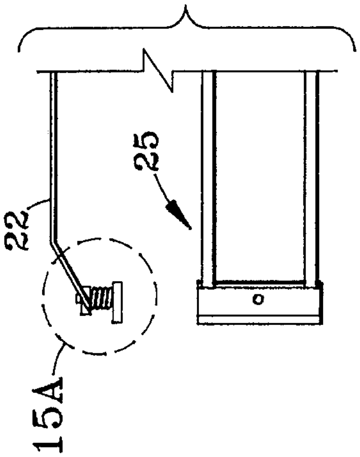
Figure 13:
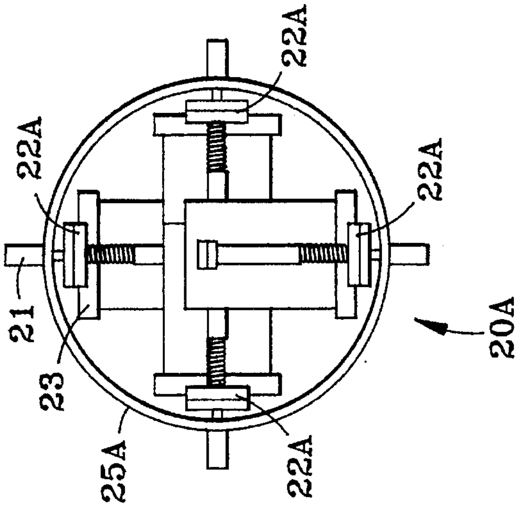
FIG. 13 is an end view of the perforating means.

As illustrated in FIG. 14, a version of the present invention allows for the perforation of pipe as the pipe comes off an extruder 50. This is done by having a flexible member 51 extending from the extruder 50 to the perforating means 20. The flexible member 51 can be a flexible shaft or a wire and conduit. The flexible member 51 supports the perforating means 20 and also provides a conduit for power to the perforating means. Preferably, there is sufficient distance between the extruder 50 and the perforation means 20 to allow the pipe 5 to cool. The pipe 5, as it comes off the extruder 50, passes over the perforating means 20 and is cut.

In all of the above versions of the present invention, it is possible to have a gear trailing the perforating means in such a way as to have the cutters move in and out thereby making alternate cuts on possibly every other rib or detent as the pipe passes over the perforating means. More than one rib could be skipped as well.

The preferred method of the present invention is to lay a pipe 5 in the carriage 10. To assist in the cutting, short sections of pipe may be inserted at either end of pipe 5 to be cut. The carriage 10 is then moved in the direction of balance member 36, thus passing the perforating means 20 through the interior of the pipe 5. After passing the pipe 5 over the perforating means 20, the carriage 10 is then rotated (indexed) with pipe 5 still in carriage 10 and perforating means located out of the pipe interior. The carriage 10 is then pulled back to its initial position, cutting another set of perforations in the pipe. The pipe 5 is then removed from the carriage 10. The preferred version of the invention employs four cutters. Thus with four cutters, and two passes over the perforating means 20 or 20A, eight series of perforations are cut around the circumference of the pipe.

The present invention may also be use to cut perforations on only one side of a pipe. Additionally, the perforating means may include drills or punches which extend and retract from the housing to create perforations in corrugated pipe.

It is thought that the present invention, the method and apparatus for perforating pipe from the inside of the pipe to the outside is understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

What is claimed is:

1. An apparatus for perforating corrugated pipe comprising:

a support system having a first end;

perforating means attached to said first end of said support system wherein said perforating means has at least one cutter and at least one motor, said cutter being coupled to said motor whereby said motor imparts rotational power to said cutter;

said perforating means having a housing, said housing being attached to said first end of said support system and having an outer surface, at least one guide member having ends, each guide member end berg attached to said housing outer surface, said at least one guide member having an outside surface and an inside surface, said at least one motor being connected to said guide member inside surface; and said cutter being mounted with a radial extension beyond said guide member outside surface, at least one spring, wherein one of said guide member or said at least one motor is attached to said housing by said at least one spring advancing means for advancing said pipe over said perforating means whereby perforations are created in said pipe.

2. The apparatus of claim 1 wherein said advancing means further comprises:

a carriage for supporting said pipe; and at least one rail, said at least one rail having a first surface, said carriage being movably connected to said at least one rail.

3. The apparatus of claim 2 wherein said carriage further comprises:

a carriage base having a carry surface;

at least one roller rotatably connected to said carry surface of said carriage base, said roller having an outside surface; and at least one substantially semicircular member, said at least one substantially semicircular member being rollingly connected to said outside surface of said at least one roller.

4. The apparatus of claim 3 wherein said carriage further comprises:

said carriage base having a track surface;

at least one wheel connected to said track surface of said carriage base, said at least one wheel being in rolling engagement with said at least one rail whereby the carriage is rollingly connected to said at least one rail.

5. The apparatus of claim 3 wherein said carriage further comprises:

a handle member; and said handle member being fixedly attached to said semicircular member, whereby said semicircular member is rotatable relative to said carriage base upon actuation of said handle member.

6. The apparatus of claim 1 wherein said support system further comprises:

an elongated member, said elongated member having an elongated member first end and an elongated member second end, said elongated member first end being connected to said perforating means; and a balance member having a first surface, said balance member first surface being fixedly connected to said second end of said elongated member, said balance member being substantially perpendicular to said elongated member.

7. The apparatus of claim 6 wherein said support system further comprises:

said balance member having a second surface, said second surface being opposite said first surface; and a counterweight, said counterweight being fixedly attached to said second surface of said balance member, whereby the moment created by the elongated member is offset.

8. The apparatus of claim 6 wherein said support system further comprises:

said elongated member having a cavity therethrough, whereby power conduits and air may pass through said elongated member.

9. The apparatus of claim 8 wherein said support system further comprises:

a blowing means, said blowing means being communicably connected to said second end of said elongated member whereby said blowing means blows air through said elongated member to said perforating means.

10. The apparatus of claim 9 wherein said blowing means comprises a fan.

11. The apparatus of claim 9 wherein said blowing means comprises a blower.

12. A method of perforating corrugated pipe comprising the steps:

advancing a pipe having an inner surface and an outer surface over a perforating means wherein said perforating means has a support system having a first end, at least one cutter and at least one motor, said cutter being coupled to said motor whereby said motor imparts rotational power to said cutter;

said perforating means having a housing, said housing being attached to said first end of said support system and having an outer surface, at least one guide member having ends, each guide member end being attached to said housing outer surface, said at least one guide member having an outside surface and an inside surface, said at least one motor being connected to said guide member inside surface; and perforating said pipe with said means for perforating by cutting said pipe from the inner surface to said pipe outer surface.

13. The method of claim 12 wherein said pipe has a longitudinal axis, further comprising the steps:

rotating said pipe about its longitudinal axis;

withdrawing said pipe from over said perforating means; and perforating said pipe with said perforating means by cutting said pipe from the inner surface to said pipe outer surface.

14. The method of claim 12 wherein said pipe has a longitudinal axis and further comprising the step of:

rotating said pipe about said pipe longitudinal axis while advancing said pipe over said perforating means, whereby said pipe is perforated in a substantially spiral manner.

15. A perforated corrugated pipe having an inner surface and an outer surface said perforated pipe perforated by advancing a pipe having an inner surface and an outer surface over a perforating means wherein said perforating means has a support system having a first end at least one cutter and at least one motor, said cutter being coupled to said motor whereby said motor imparts rotational power to said cutter;

said perforating means having a housing, said housing being attached to said first end of said support system and having an outer surface, at least one guide member having ends, each guide member end being attached to said housing outer surface, said at least one guide member having an outside surface and an inside surface, said at least one motor being connected to said guide member inside surface said cutter being mounted with a radial extension beyond said guide member outside surface, at least one spring, wherein one of said guide member or said at least one motor is attached to said housing by said at least one spring; and perforating said pipe with said perforating means by cutting said pipe from the inner surface to said pipe outer surface.

16. The perforated pipe of claim 19 having a longitudinal axis and further perforated by rotating said pipe about said pipe longitudinal axis while advancing said pipe over said perforating means, whereby said pipe is perforated in a substantially spiral manner.

17. An apparatus for perforating corrugated pipe comprising:

a support system having a first end;

means for perforating said pipe attached to said first end of said support system wherein said perforating means has at least one cutter and at least one motor, said cutter being coupled to said motor whereby said motor imparts rotational power to said cutter;

said perforating means comprising a housing, said housing being attached to said first end of said support system and having an outer surface, at least one guide member having ends, each guide member end being attached to said housing outer surface, said at least one guide member having an outside surface and an inside surface, said at least one motor being connected to said guide member inside surface said cutter being mounted with a radial extension beyond said guide member outside surface, at least one spring, wherein one of said guide member or said at least one motor is attached to said housing by said at least one spring; and means for causing said pipe and said means for perforating said pipe to perforatingly interengage interior of said pipe whereby perforations are created in said pipe.

* * * * *